3,140,319
PREPARATION OF p-NITROHALOBENZENES
Allen K. Sparks, Des Plaines, Ill., assignor to Universal Oil Products Company, Des Plaines, Ill., a corporation of Delaware
No Drawing. Filed Jan. 31, 1963, Ser. No. 255,185
13 Claims. (Cl. 260—646)

This invention relates to the nitration of halobenzenes. More particularly, this invention relates to a method of increasing the amount of the para isomer in a nitrohalobenzene nitration product.

Nitrohalobenzenes are in general valuable chemical intermediates in the production of dyes, and also in the production of inhibitors or antiozonants for rubber, gasoline, and the like. In many cases, products prepared from the para isomer of a nitrohalobenzene possess superior qualities with respect to their intended application. For example, it is known that N-phenyl-N'-cyclohexyl-p-phenylenediamine is a particularly effective antiozonant for rubber. The preparaton of this highly useful compound is initially dependent upon the preparation of p-nitrochlorobenzene (a product of the method of this invention) which, upon condensation with analine, followed by reductive alkylation with cyclohexanone, is converted to the desired N-phenyl-N'-cyclohexyl-p-phenylenediamine.

It is an object of this invention to present a novel method of nitrating a halobenzene to effect an increase in the amount of the para isomer in the nitrohalobenzene nitration product.

In one of its broad aspects this invention embodies a method of increasing the amount of the para isomer in a nitrohalobenzene nitration product, which method comprises nitrating said halobenzene with nitric acid in a solution comprising sulfuric acid and a sulfone selected from the group consisting of a dialkyl sulfone, a bis(alkylsulfonyl)alkane, and an alkylene sulfone, said sulfuric acid comprising from about 20 mole percent to about 85 mole percent of said solution. Although the method of this invention is described with relation to sulfuric acid, generally used with nitric acid in conventional nitrating mixtures, it is understood that other mineral acids such as phosphoric acid, perchloric acid, hydrofluoric acid, etc., known to serve essentially the same function as sulfuric acid, may be utilized, although not necessarily with the same or equivalent results.

One specific embodiment of this invention is in the nitration of chlorobenzene, and the method of increasing the amount of p-nitrochlorobenzene in the nitrochlorobenzene nitration product, which method comprises nitrating said chlorobenzene with nitric acid in a solution comprising sulfuric acid and tetramethylene sulfone, said sulfuric acid comprising from about 35 mole percent to about 70 mole percent of said solution.

Another specific embodiment is in the nitration of chlorobenzene, and the method of increasing the amount of the p-nitrochlorobenzene in the nitrochlorobenzene nitration product, which method comprises nitrating said chlorobenzene with nitric acid in a solution comprising sulfuric acid and di-n-propyl sulfone, said sulfuric acid comprising from about 35 mole percent to about 70 mole percent of said solution.

Still another specific embodiment of the present invention is in the nitration of chlorobenzene, and the method of increasing the amount of p-nitrochlorobenzene in the nitrochlorobenzene nitration product, which method comprises nitrating said nitrochlorobenzene with nitric acid in a solution comprising sulfuric acid and bis(ethylsulfonyl)methylethylmethane, said sulfuric acid comprising from about 35 mole percent to about 70 mole percent of said solution.

Other objects and embodiments of this invention will become apparent in the following detailed specification.

The method of this invention finds specific utility with respect to nitratable halobenzenes subject to the ortho-para directing influence of the halo substituent, or substituents, wherein the position para to the halo substituent, and at least one position ortho thereto, are open to nitration. The present invention is particularly applicable to the nitration of mono halobenzenes, i.e., chlorobenzene, bromobenzene, fluorobenzene, and iodobenzene. It is contemplated that the method of this invention in effect inhibits the ortho directing influence of the halo substituent and thereby effects an increase in the amount of the para isomer in the nitrohalobenzene nitration product, the para position being open to nitration. For example, in the nitration of 1,2-dichlorobenzene, substitution of the aromatic nucleus is inhibited in a position ortho to either of the chloro substituents so that nitration occurs principally in a position para to either of the chloro substituents to give primarily a 1,2-dichloro-4-nitrobenzene nitration product. The method of this invention is thus further applicable to the nitration of dihalobenzenes including 1,2-dibromobenzene, 1,2-difluorobenzene, 1,2-diiodobenzene, etc., and also trihalobenzenes including 1,2,3-trichlorobenzene, 1,2,3-tribromobenzene, 1,2,3-triiodobenzene, 1,2,3-trifluorobenzene, etc., and many other nitratable halobenzenes which will be apparent to those skilled in the art.

In accordance with the method of this invention, a nitratable halobenzene is nitrated with nitric acid in a solution comprising sulfuric acid and a sulfone. Suitable sulfones are those which act as a mutual solvent for nitric and sulfuric acids at nitration reaction conditions while remaining substantially inert to the oxidizing effect of nitric acid. Suitable sulfones include dialkyl sulfones, for example, dimethyl sulfone, methyl ethyl sulfone, methyl n-propyl sulfone, methyl n-butyl sulfone, methyl n-pentyl sulfone, diethyl sulfone, ethyl n-propyl sulfone, ethyl n-butyl sulfone, di n-propyl sulfone, and also the various structural isomers thereof such as methyl isopropyl sulfone, methyl sec-butyl sulfone, methyl isobutyl sulfone, methyl t-butyl sulfone, methyl 1-methylbutyl sulfone, methyl 2-methylbutyl sulfone, methyl isopentyl sulfone, methyl 1,1-dimethylpropyl sulfone, methyl 2,2-dimethylpropyl sulfone, ethyl isopropyl sulfone, ethyl sec-butyl sulfone, ethyl isobutyl sulfone, ethyl t-butyl sulfone, di-isopropyl sulfone, etc., and also bis(alkylsulfonyl)alkanes such as bis(methylsulfonyl)methane, bis(ethylsulfonyl)methane, bis(ethylsulfonyl)dimethylmethane, bis(ethylsulfonyl)methylethylmethane, and the like, and also alkylene sulfones for example, trimethylene sulfone, tetramethylene sulfone, pentamethylene sulfone, hexamethylene sulfone, etc. In general, sulfones containing up to about 10 carbon atoms are operable. It is preferred to utilize a sulfone selected from the group consisting of a dialkyl sulfone, a bis(alkylsulfonyl)alkane, and an alkylene sulfone, and containing up to about 8 carbon atoms.

When a nitratable halobenzene, such as chlorobenzene, is nitrated with nitric acid in soluton with a sulfone, there is no observable deviation from the normal isomer distribution of about 65% para and about 35% ortho in the nitrohalobenzene nitration product. On the other hand, when the nitration takes place in a solution of a sulfone and sulfuric acid, the isomer distribution is substantially immediately shifted in favor of the para isomer although said solution comprises less than about 10 mole percent sulfuric acid. In general, a suitable yield of nitrohalobenzene nitration product containing a substantial increase in the amount of para isomer therein is effected in a solution of a sulfone and sulfuric acid wherein said solution comprises from about 20 mole percent to about 85 mole percent sulfuric acid. A preferred embodiment of this invention relates to the nitration of a nitratable halobenzene wherein said halobenzene is nitrated with nitric acid in a solution comprising sulfuric acid and a sulfone, said solution comprising from about 35 mole percent to about 70 mole percent sulfuric acid.

Nitration of halobenzenes, in accordance with the method of this invention, may be effected in a batch or a continuous type of operation by any conventional or otherwise convenient means. One suitable manner of operation comprises a batch type of operation wherein the halobenzene to be nitrated and the selected sulfone are initially charged to a reaction vessel equipped with suitable means of mixing and cooling the vessel contents. The halobenzene and the sulfone are stirred together while sulfuric acid is added thereto with cooling. Nitric acid is thereafter added to the stirred contents of the reaction vessel by means of a dropping funnel, or other suitable device, at nitration reaction conditions. On completion of the nitration reaction, the reaction mixture is hydrolyzed and thereafter neutralized with aqueous caustic solution. The aqueous layer is separated and extracted one or more times with benzene. The benzene extract is then combined with the organic layer, which is thereafter dried, and the nitrohalobenzene product, unreacted halobenzene, sulfone, and benzene are separated therefrom by conventional means, for example, by fractional distillation. In a continuous flow type of operation, the halobenzene, sulfone, and sulfuric acid starting materials may be pre-mixed and the mixture continuously charged in a single stream to a reactor equipped with mixing and cooling means, or said starting materials may be continuously charged in individual streams and thereafter admixed in the stirred reactor. In either case, the mixture is subsequently contacted with a flow of nitric acid introduced to the reactor at a point downstream, and at nitration reaction conditions. The reactor effluent is continuously withdrawn at a rate which will insure an adequate residence time therein. The reaction mixture is treated as previously described and the unreacted starting materials recycled in combination with a fresh charge of the same.

The following examples are presented in illustration of the method of this invention. It is not intended that said examples serve to limit the generally broad scope of this invention as set out in the appended claims.

*Example I*

This example is presented to illustrate the isomer distribution of a nitrohalobenzene product derived through conventional methods of nitration using a nitric acid-sulfuric acid nitrating mixture in the absence of a sulfone. Over a period of about 1.5 hours, 0.25 mole of 90% nitric acid was added to a stirred mixture comprising 0.5 mole of chlorobenzene and 0.5 mole of 96% sulfuric acid. The temperature was maintained at about 25° C. After a total reaction time of about 3 hours the reaction mixture was poured over crushed ice and neutralized with 20% sodium hydroxide solution. The resulting aqueous layer was separated from the organic layer and extracted about 4 times with benzene. The benzene extract was then combined with the organic layer and dried over anhydrous sodium sulfate. After separation of the benzene by distillation, the remainder of the reaction mixture was analyzed by gas-liquid chromatography methods. The yield of nitrochlorobenzene in this case amounted to about a 90% yield based on the quantity of nitric acid charged, of which about 65.3% was the para isomer, about 34.6% the ortho isomer, and about 0.1% the meta isomer.

*Example II*

0.5 mole of 96% sulfuric acid was added slowly and with cooling to a stirred solution comprising about 0.5 mole of chlorobenzene and 0.25 mole of tetramethylene sulfone. Thereafter, and over a period of about 1.5 hours, 0.25 mole of 90% nitric acid was added with stirring while maintaining the reaction mixture at about 25° C. After a total reaction time of about 3 hours had elapsed the reaction mixture was poured over crushed ice, neutralized with 20% sodium hydroxide solution, and further treated as described in Example I. The yield of nitrochlorobenzene was about 100% based on the quantity of nitric acid charged. There was an increase in the para isomer to about 72.2%, a corresponding decrease in the ortho isomer to about 27.9%, and about 0.5% meta isomer. Substantially all of the tetramethylene sulfone was recovered.

*Example III*

About 0.5 mole of 96% sulfuric acid was added slowly and with cooling to a stirred solution comprising about 0.5 mole of chlorobenzene and 0.50 mole of tetramethylene sulfone. Thereafter, and over a period of about 1.5 hours, 0.25 mole of 90% nitric acid was added with stirring while maintaining the reaction mixture at about 25° C. After a total reaction time of about 3 hours had elapsed the reaction mixture was poured over crushed ice, neutralized with 20% sodium hydroxide solution, and further treated as described in Example I. The yield of nitrochlorobenzene was about 84% based on the quantity of nitric acid charged. There was an increase in the para isomer to about 74.9%, corresponding decrease in the ortho isomer to about 25.1%, and none of the meta isomer was detected. Substantially all of the tetramethylene sulfone was recovered.

*Example IV*

About 0.25 mole of 90% nitric acid is added slowly and with cooling to a stirred mixture comprising about 0.5 mole of 96% sulfuric acid, 0.5 mole of chlorobenzene, and 0.25 mole of di-n-propyl sulfone. The nitric acid is added over a period of about 1.5 hours while maintaining the reaction mixture at approximately 25° C. After a total reaction time of about 3 hours, the reaction mixture is hydrolyzed with crushed ice, neutralized with about 20% caustic solution, and further treated as described in Example I. The nitrochlorobenzene product comprises in excess of about 70% p-nitrochlorobenzene and less than about 30% o-nitrochlorobenzene.

*Example V*

About 0.5 mole of 96% sulfuric acid is added slowly and with cooling to a stirred mixture comprising about 0.5 mole of chlorobenzene and about 0.25 mole of dimethyl sulfone. Thereafter, and over a period of about 1.5 hours, 0.25 mole of 90% nitric acid is added with stirring while maintaining the reaction mixture at about 25° C. After a total reaction time of about 3 hours, the reaction mixture is poured over crushed ice, neutralized with 20% sodium hydroxide solution, and further treated as described in Example I. The nitrochlorobenzene product comprises in excess of about 70% p-nitrochlorobenzene and less than about 30% o-nitrochlorobenzene.

*Example VI*

About 0.5 mole of chlorobenzene is admixed with a solution of about 0.5 mole of 96% sulfuric acid and 0.25 mole of bis(ethylsulfonyl)methylethylmethane. Approximately 0.25 mole of nitric acid is thereafter added slowly and with stirring while maintaining the temperature at about 25° C. After a total reaction time of about 3 hours has elapsed, the reaction mixture is hydrolyzed with crushed ice, neutralized with about 20% caustic solution, and further treated as described in Example I. The nitrochlorobenzene product comprises in excess of about 70% p-nitrochlorobenzene and less than about 30% o-nitrochlorobenzene.

I claim as my invention:

1. In the nitration of a nitratable halobenzene, a method of increasing the amount of the para isomer in the nitrohalobenzene nitration product, which method comprises nitrating said halobenzene with nitric acid in a solution comprising sulfuric acid and a sulfone selected from the group consisting of a dialkyl sulfone, a bis(alkylsulfonyl)alkane, and an alkylene sulfone, said sulfuric acid comprising from about 20 mole percent to about 85 mole percent of said solution.

2. The method of claim 1 further characterized in that said solution comprises sulfuric acid and a dialkyl sulfone.

3. The method of claim 1 further characterized in that said solution comprises sulfuric acid and a bis(alkylsulfonyl)alkane.

4. The method of claim 1 further characterized in that said solution comprises sulfuric acid and an alkylene sulfone.

5. In the nitration of a nitratable halobenzene, a method of increasing the amount of the para isomer in the nitrohalobenzene nitration product, which method comprises nitrating said halobenzene with nitric acid in a solution comprising sulfuric acid and a sulfone selected from the group consisting of a dialkyl sulfone, a bis(alkylsulfonyl)alkane, and an alkylene sulfone, said sulfuric acid comprising from about 35 mole percent to about 70 mole percent of said solution.

6. The method of claim 5 further characterized in that said solution comprises sulfuric acid and a dialkyl sulfone.

7. The method of claim 5 further characterized in that said solution comprises sulfuric acid and a bis(alkylsulfonyl)alkane.

8. The method of claim 5 further characterized in that said solution comprises sulfuric acid and an alkylene sulfone.

9. In the nitration of chlorobenzene, a method of increasing the amount of p-nitrochlorobenzene in the nitrochlorobenzene nitration product, which method comprises nitrating said chlorobenzene with nitric acid in a solution comprising sulfuric acid and di-n-propyl sulfone, said sulfuric acid comprising from about 35 mole percent to about 70 mole percent of said solution.

10. In the nitration of chlorobenzene, a method of increasing the amount of p-nitrochlorobenzene in the nitrochlorobenzene nitration product, which method comprises nitrating said chlorobenzene with nitric acid in a solution comprising sulfuric acid and tetramethylene sulfone, said sulfuric acid comprising from about 35 mole percent to about 70 mole percent of said solution.

11. In the nitration of chlorobenzene, a method of increasing the amount of p-nitrochlorobenzene in the nitrochlorobenzene nitration product, which method comprises nitrating said chlorobenzene with nitric acid in a solution comprising sulfuric acid and bis(ethylsulfonyl)methylethylethane, said sulfuric acid comprising from about 35 mole percent to about 70 mole percent of said solution.

12. In the nitration of chlorobenzene, a method of increasing the amount of p-nitrochlorobenzene in the nitrochlorobenzene nitration product, which method comprises nitrating said chlorobenzene with nitric acid in a solution comprising sulfuric acid and diethylsulfone, said sulfuric acid comprising from about 35 mole percent to about 70 mole percent of said solution.

13. In the nitration of chlorobenzene, a method of increasing the amount of the p-nitrochlorobenzene in the nitrochlorobenzene nitration product, which method comprises nitrating said chlorobenzene with nitric acid in a solution comprising sulfuric acid and dimethyl sulfone, said sulfuric acid comprising from about 35 mole percent to about 70 mole percent of said solution.

References Cited in the file of this patent

UNITED STATES PATENTS 3,077,502     Leib _____ Feb. 12, 1963